(12) United States Patent
Teichmann et al.

(10) Patent No.: US 7,081,955 B2
(45) Date of Patent: Jul. 25, 2006

(54) PHOTODETECTOR AND SPECTROMETER USING THE SAME

(75) Inventors: Helmut Teichmann, Zurich (CH); Dietmar Hiller, Zurich (CH); Ulrich Starker, Zurich (CH)

(73) Assignee: Hamamatsu Photonics K.K., Shizuoka (JP)

(\*) Notice: Subject to any disclaimer, the term of this patent is extended or adjusted under 35 U.S.C. 154(b) by 0 days.

(21) Appl. No.: 10/854,628

(22) Filed: May 27, 2004

(65) Prior Publication Data

US 2004/0239931 A1    Dec. 2, 2004

(30) Foreign Application Priority Data

May 28, 2003    (JP) ............................ P2003-151415

(51) Int. Cl.
*G01J 3/18* (2006.01)
*G01J 3/28* (2006.01)

(52) U.S. Cl. ..................................... 356/328

(58) Field of Classification Search ................ 356/326, 356/328
See application file for complete search history.

(56) References Cited

U.S. PATENT DOCUMENTS

| | | | |
|---|---|---|---|
| 4,644,632 A | 2/1987 | Mächler et al. ............. 29/469 |
| 4,744,618 A | 5/1988 | Mahlein .................. 350/96.19 |
| 4,784,935 A | 11/1988 | Ehrfeld et al. ............. 340/321 |
| 4,984,888 A | 1/1991 | Tobias ........................ 356/328 |
| 4,999,489 A | 3/1991 | Huggins ..................... 250/226 |
| 5,026,160 A | 6/1991 | Dorain et al. ............... 356/328 |
| 5,159,404 A | 10/1992 | Bittner ....................... 356/328 |
| 5,493,393 A | 2/1996 | Beranek et al. ............. 356/328 |
| 5,754,290 A | 5/1998 | Rajic et al. ................. 356/328 |
| 5,812,262 A | 9/1998 | Ridyard et al. ............. 356/328 |
| 5,991,023 A | 11/1999 | Morawski et al. .......... 356/326 |
| 6,002,479 A | 12/1999 | Barwicz et al. ............. 356/326 |
| 6,002,488 A | 12/1999 | Berg et al. .................. 356/418 |
| 6,081,331 A | 6/2000 | Teichmann ................. 356/328 |
| 2002/0060792 A1 | 5/2002 | Ibsen et al. ................. 356/328 |

FOREIGN PATENT DOCUMENTS

| | | |
|---|---|---|
| DE | 197 17 015 A1 | 10/1998 |
| DE | 198 36 595 A1 | 2/2000 |
| EP | 0 942 266 A1 | 9/1999 |
| EP | 1 041 372 A1 | 10/2000 |
| EP | 0 978 005 B1 | 3/2002 |
| GB | 2 012 067 A | 7/1979 |
| JP | 2000-65642 | 3/2000 |
| WO | WO 98/01729 | 1/1998 |
| WO | WO 00/40935 | 7/2000 |
| WO | WO 01/86848 | 11/2001 |

*Primary Examiner*—F. L. Evans
(74) *Attorney, Agent, or Firm*—Drinker Biddle & Reath LLP (57) ABSTRACT

A spectrometer is configured by using a photodetector 1B which comprises a semiconductor substrate 10 having an upper surface 10a, a photodiode array 11 having a plurality of photodiodes 12 aligned on the upper surface 10a of the substrate 10, and a light input section 13 including an opening formed in a predetermined positional relationship to the photodiode array 11; and a main body 2 having a plate portion 20 and support portions 21 and 22 mounted on the substrate 10 of the photodetector 1B. The spectrometer is provided with a lens 23 protruded from a lower face 20b of the plate portion 20 and a planar aberration-reduced blazed reflection diffraction grating 24 provided on an upper face 20a of the plate portion 20 for separating incident light having entered through the light input section 13 and passed through the lens 23 into its spectral components, and configured to detect the spectral components with the photodiode array 11. Thus, a photodetector capable of improving the positioning accuracy of components when it is applied to a spectrometer and the spectrometer using the same are realized.

18 Claims, 11 Drawing Sheets

PHOTODETECTOR AND SPECTROMETER USING THE SAME

BACKGROUND OF THE INVENTION

1. Field of the Invention

This invention relates to a photodetector including a photodetection element array and to a spectrometer using the photodetector.

2. Related Background Art

A spectrometer is an optical device for separating light to be measured into its spectral components with a dispersive element such as a prism or a diffraction grating. By detecting the spectral components of light separated by the dispersive element, the wavelength distribution of the light or the intensity of a specific wavelength component of the light can be known. Thus, spectrometers are used in a variety of application areas (for example, See Reference 1: JP-A-2000-65642).

SUMMARY OF THE INVENTION

In a dispersive spectrometer using a diffraction grating or the like, a photodiode array comprising a plurality of photodiodes is used as one of detecting means provided downstream of the diffraction grating for detecting separated spectral components of light. By detecting each of the spectral components with a corresponding photodiode, the wavelength distribution of the light can be measured.

A slit-like light input member is provided upstream of the diffraction grating to limit the path or the incident angle of light to be measured entering the diffraction grating. The light input member, the dispersive element and the photodiode array are suitably positioned and integrally secured by a housing.

To obtain a spectrometer capable of performing measurement with high resolution and high precision, the light input member, the dispersive element and the photodiode array must be positioned with high accuracy. In such a spectrometer as above, however, the process of aligning and securing the component elements is complicated and the required positioning accuracy may not be obtained in the alignment process. Also, it is difficult to downsize the spectrometer as a whole.

The present invention has been made to solve the above problems and it is, therefore, an object of the present invention to provide a photodetector which, when applied to a spectrometer, enables component elements thereof to be positioned with high accuracy and a spectrometer using the photodetector.

In accomplishing the above object, a photodetector of the present invention comprises: (1) a substrate; (2) a photodetection element array having a plurality of photodetection elements provided on the substrate in a predetermined arrangement; and (3) a light input section including an opening formed through the substrate in a predetermined positional relationship to the photodetection element array for allowing incident light to be detected by the photodetection elements to pass therethrough.

In the above photodetector, a photodetection element array used to detect separated spectral components of light and an opening used as an input for incident light to be measured when the photodetector is incorporated in a spectrometer are integrally formed on one substrate. With this configuration, the photodetection element array and the light input section as component elements of a spectrometer can be located in a predetermined positional relationship to each other with high accuracy. Thus, there can be obtained a photodetector which enables component elements of a spectrometer to be positioned with high accuracy. Additionally, the degree of freedom in arranging the photodetection element array and the light input section can be improved. Here, this photodetector can be configured as a front-side illuminated detector, or a back-side illuminated detector.

The photodetector preferably further comprises a positioning section including an opening formed through the substrate, a recess formed in the substrate, a protrusion formed on the substrate, or an electrode structure formed on the substrate in a predetermined positional relationship to the photodetection element array for locating a given member in a specific position on one surface of the substrate. Since the photodetector is provided with the positioning section in addition to the light input section, the other component elements of a spectrometer such as a dispersive element can be easily disposed in a predetermined positional relationship to the photodetector with high accuracy.

The light input section may be filled by a material which transmits light within one or a plurality of wavelength ranges by a specific transmittance. Alternatively, an optical member for transmitting light under specific conditions may be provided in the light input section. Specific examples of such an optical member include a slit member, a lens and an optical filter. Alternatively, the opening of the light input section may be used as a slit as it is.

Further, the photodetector may comprise a photodetection element additionally provided on the substrate in a predetermined positional relationship to the photodetection element array. Such an additional photodetection element can be used, for example, for the zero-order light detection.

The photodetector may be configured so that the light input section includes a plurality of openings and the photodetection element array comprises a plural arrays of photodetection elements provided to correspond to the plurality of openings. According to this configuration, a photodetector applicable to various types of spectrometers can be obtained, for example, types of spectrometers such as spectrometers having more than one input channel, or spectrometers which resolve spectral properties along a line of input channels.

Moreover, the photodetector may be configured so that an optical fiber is provided for incident light through the light input section.

A spectrometer of the present invention comprises: (1) the above-described photodetector; (2) a main body disposed in a specific position in contact with a surface of the substrate; and (3) a dispersive element provided on a face of the main body or a surface of the substrate and located in a light path along which light travels from the light input section to the photodetection element array, and wherein (4) light having entered through the light input section is separated into its spectral components by the dispersive element and the spectral components are detected by corresponding photodetection elements of the photodetection element array.

Since the photodetector including a substrate having a photodetection element array and a light input section is used in the spectrometer, there can be obtained a spectrometer in which the above component elements are positioned with high accuracy. In addition, there is no need for a step of aligning and securing a photodetection element array and a light input member, so that the production of the spectrometer can be facilitated. The spectrometer of the present invention comprises a photodetector, and a main body and so on disposed on the substrate of the photodetector. Such a spectrometer can be downsized as a whole by, for example, adopting an on-chip structure.

The spectrometer is preferably configured so that the photodetector has a detector-sided positioning section including an opening formed through the substrate, a recess formed in the substrate, a protrusion formed on the substrate, or an electrode structure formed on the substrate in a predetermined positional relationship to the photodetection element array, and the main body has a main body-sided positioning section engageable with the detector-sided positioning section for positioning the main body on the substrate. Such a configuration in which both the photodetector and the main body have a positioning section allows positioning by passive alignment in producing the spectrometer. Thus, the production process of the spectrometer can be further facilitated.

In one configuration of the main body disposed on the photodetector, the main body comprises a plate portion disposed at a distance from the substrate of the photodetector and having an inside face which is an optical surface opposed to the substrate; and a support portion for supporting the plate portion on the substrate.

With this main body configuration, the spectrometer may further comprise a lens provided on the inside face of the plate portion and located in the light path; and a planar reflective diffraction grating which is located on the outside face of the plate portion in a predetermined positional relationship to the lens and which functions as the dispersive element for separating light having passed through the lens. Alternatively, the spectrometer may include a concave reflective diffraction grating which is provided on the inside or outside face of the plate portion and located in the light path and which functions as the dispersive element.

In another configuration, the main body is disposed such that an optical surface opposed to the substrate is in contact with the substrate and formed of a material which transmits light within a specific wavelength range.

With this main body configuration, the spectrometer may further comprise a concave reflective diffraction grating which is provided on an outside face of the main body and located in the light path and which functions as the dispersive element.

Alternatively, the spectrometer may further comprise a reflective diffraction grating-which is provided on a surface of the substrate and which functions as the dispersive element; and a reflecting mirror provided on a face of the main body and located in a specific position in a light pass along which light travels from the light input section to the reflective diffraction grating and from the reflective diffraction grating to the photodetection element array.

The spectrometer is preferably configured so that the main body and an optical element on the main body are integrally formed by molding a specific material. Thereby, the photodetection element array and the light input section of the photodetector and the optical element of the main body can be located in a predetermined positional relationship to each other with accuracy. Also, a spectrometer constructed by a combination of a photodetector and a main body can be easily mass produced. Especially, injection molding would enable the component elements to be positioned with high accuracy.

The spectrometer preferably further comprises a light shielding member, or more than one light shielding members, or an aperture, or more than one apertures, provided between the light input section and the photodetection element array. Thereby, the influence of stray light in spectroscopic measurement can be reduced. Here, apertures and shieldings may be defined by patterned coatings of the facets of the optical members. In this case, a shielding does not need a new member, but only a coating or partial blackening of member surfaces.

Moreover, the spectrometer may be configured so that the dispersive element is a diffraction efficiency optimized blazed grating or an aberration corrected grating or both.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Description will be hereinafter made of the preferred embodiments of a photodetector and a spectrometer using the photodetector according to the present invention with reference to accompanying drawings. In the description of the drawings the same elements will be denoted by the same reference symbols and redundant description will be omitted. It is also noted that the dimensional ratios in the drawings do not always agree with those in the description.

The configuration of the photodetector according to the present invention will be first described.

Figure 1:
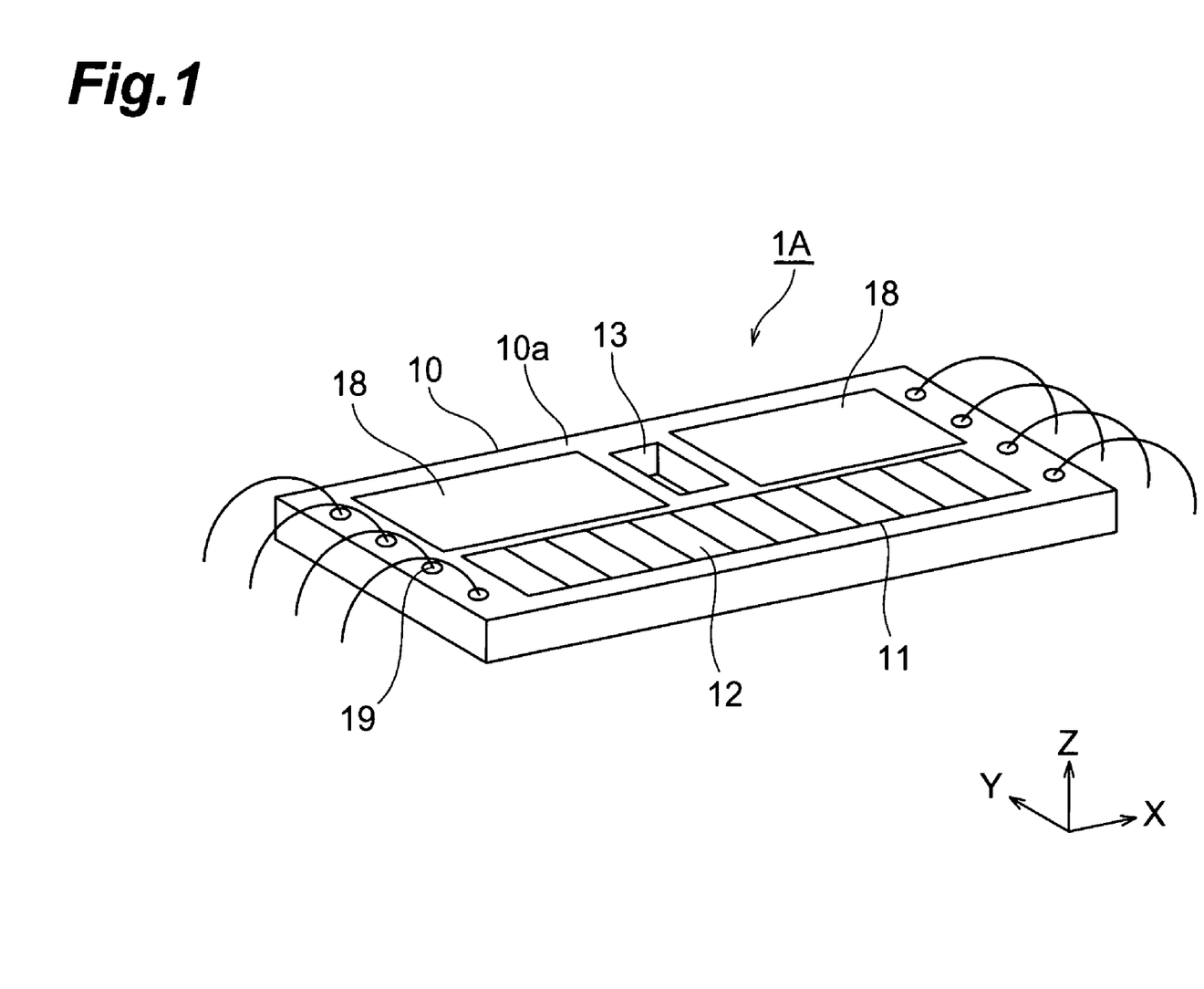
FIG. 1 is a perspective view illustrating the front side of a photodetector according to an embodiment of the present invention.
Figure 2:
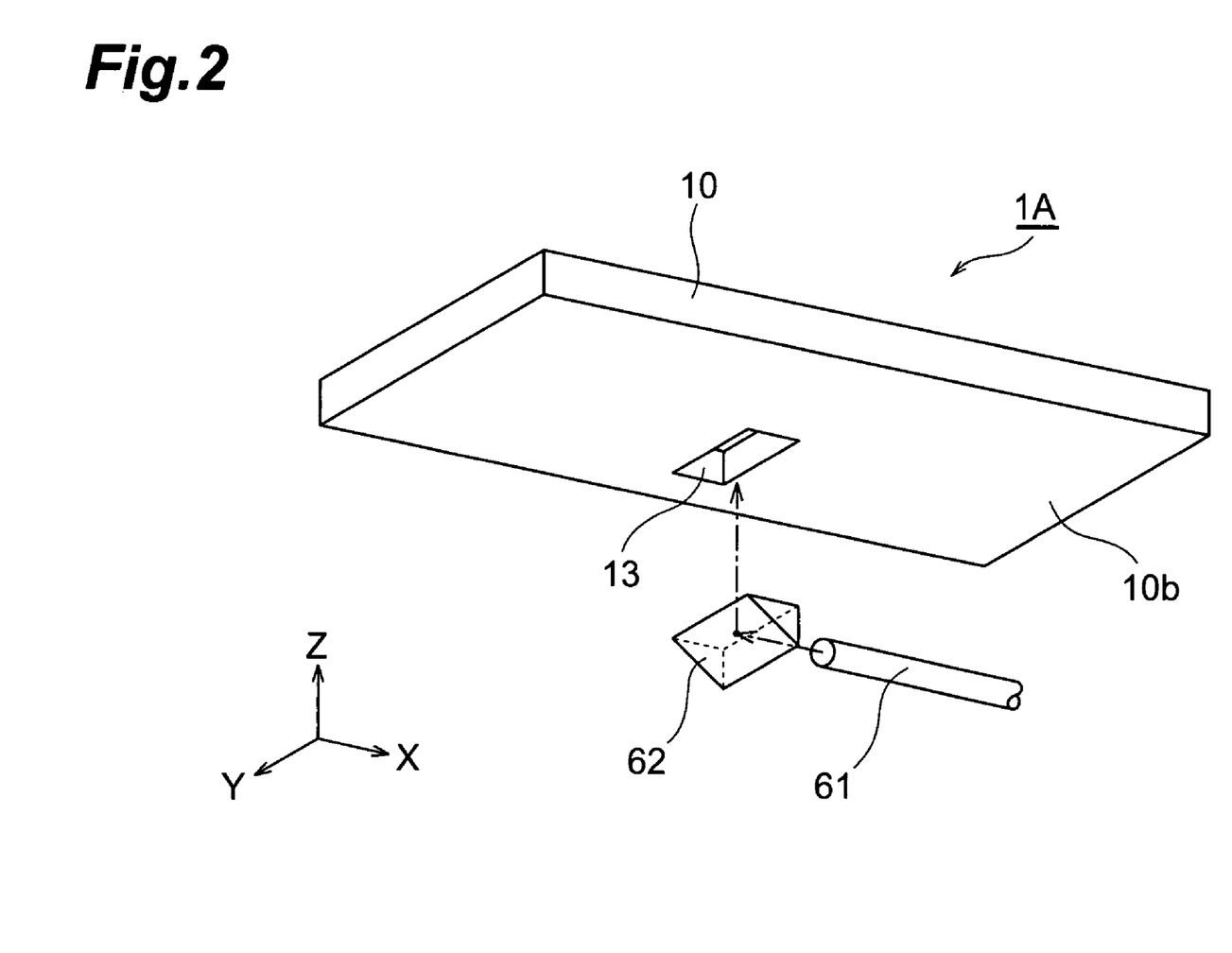
FIG. 2 is a perspective view illustrating the back side of the photodetector shown in FIG. 1.

FIG. 1 is a perspective view illustrating the front side of a photodetector according to an embodiment of the present invention, and FIG. 2 is a perspective view illustrating the back side of the photodetector shown in FIG. 1.

Here, for convenience of explanation, an axis perpendicular to a surface of the substrate of the photodetector is defined as z-axis, and two axes extending perpendicular to the z-axis and defining the surface of the substrate are defined as x-axis and y-axis, respectively, as shown in FIG. 1. Also, according to need for explanation, the negative and positive sides of the x-axis are defined as the left hand side and right hand side, respectively, the negative and positive sides of the y-axis are defined as the front side and rear side, respectively, and the negative and positive sides of the z-axis are defined as the downside and upside, respectively.

A photodetector 1A of this embodiment has a substrate 10 of a semiconductor material such as silicon (Si). On an upper surface 10a of the substrate 10, a plurality of photodiodes (photodetection elements) 12 are arranged in a predetermined arrangement to form a photodiode array (photodetection element array) 11. The photodiode array 11 is used for detection of separated spectral components of light when the photodetector 1A is incorporated in a spectrometer as described later. In FIG. 1, the photodiode array 11 is located on the front side of the upper surface 10a and the photodiodes 12 thereof are aligned along the x-axis.

The substrate 10 has an opening 13 formed therethrough from the upper surface 10a to a lower surface 10b. This opening 13 is used as a light input section of incident light to be detected by the photodiodes 12 when the photodetector 1A is incorporated in a spectrometer, and located in a predetermined positional relationship to the photodiode array 11. In FIG. 1, the light input section 13 has a rectangular slit shape of the opening and is formed in a position on the rear side of the substrate 10 and in the vicinity of the middle of the photodiode array 11.

On the rear side of the upper surface 10a of the substrate 10, electronic circuit sections 18 are provided on both sides of the light input section 13 located in the middle of the rear side of the upper surface 10a of the substrate 10. In the electronic circuit sections 18 are provided lines, circuits and so on necessary to supply a bias voltage to the photodiodes 12 included in the photodiode array 11 and to process signals. There are provided electrode pads 19, each used for input and output of an electric signal through a bonding wire, on the upper surface 10a along the right and left edges thereof.

The effects of the photodetector 1A of this embodiment will be described.

In the photodetector 1A shown in FIG. 1 and FIG. 2, the photodiode array 11 and the opening as the light input section 13 are integrally formed on the substrate 10. According to this configuration, when the photodetector 1A is applied to a spectrometer, the photodiode array 11 and the light input section 13 as component elements of the spectrometer can be formed and located beforehand in a predetermined positional relationship to each other with high accuracy. Thus, there can be obtained a photodetector which enables component elements of a spectrometer to be positioned with high accuracy.

In such a configuration, the degree of freedom in arranging the photodiode array 11 and the light input section 13 is high as compared to a configuration in which a photodiode array and a light input member are produced separately and secured in an aligned manner. The high degree of freedom for arrangement is advantageous in constituting a spectrometer using a photodetector having a photodiode array.

When the photodetector 1A is incorporated in a spectrometer, incident light is passed through the light input section 13 from the side of the lower surface 10b to the side of the upper surface 10a of the substrate 10. The opening of the light input section 13 preferably has a rectangular shape, and has inside faces which are perpendicular or inclined at a specified angle to the upper and lower surfaces 10a and 10b of the substrate 10 and limit the path and/or the incident angle of incident light to be measured directed into the spectrometer. The light input section 13 may be filled by a material, for example a resin material, which transmits the light to be measured within a specific wanted wavelength range or wavelength ranges at least to a certain extent by a specific transmittance.

Alternatively, an optical member for transmitting light under specific conditions may be provided in the light input section 13. For example, a slit member may be fitted in the light input section 13. In this case, the shape of the slit can be varied as desired by exchanging the slit member for another. Also, a lens for converging or collimating incident light or an optical filter such as a wavelength filter which selectively transmits light within a specific wavelength band may be provided in the light input section 13.

As means for putting in light through the light input section 13, various means can be adopted. For example, FIG. 2 shows a constitution in which light emitted from an optical fiber 61 is reflected by a prism 62 disposed below the light input section 13. When an optical fiber for incident light is provided on the side of the lower surface 10b of the substrate 10, a V-groove for positioning and securing the optical fiber is preferably formed in the lower surface 10b.

One or a plurality of light shielding members for shielding light with a specific wavelength, or apertures, may be provided between the light input section 13 and the photodiode array 11. Thereby, in a spectrometer using the photodetector 1A, the influence of stray light in spectroscopic measurement can be reduced.

Here, apertures and shieldings may be defined by patterned coatings of the facets of the optical members. In this case, a shielding does not need a new member, but only a coating or partial blackening of member surfaces. Further, patterned high reflection coating on the grating surface as well as a patterned absorptive coating of the lens act as additional shieldings by effective apertures. Additionally, anti reflection coatings or other means can be used on the lens surface to avoid unwanted back reflections.

Moreover, in general, the photodetector can be configured as a front-side illuminated detector, or a back-side illuminated detector. In the case of the back-side illuminated detector, light is illuminated from the front-side surface of the substrate, and photodetection elements are formed on the back-side surface of the substrate for receiving the incident light on the back-side surface. The substrate may be partly or entirely made thin. It is preferable to use the back-side illuminated detector for the detection of light with a short wavelength.

Figure 3:
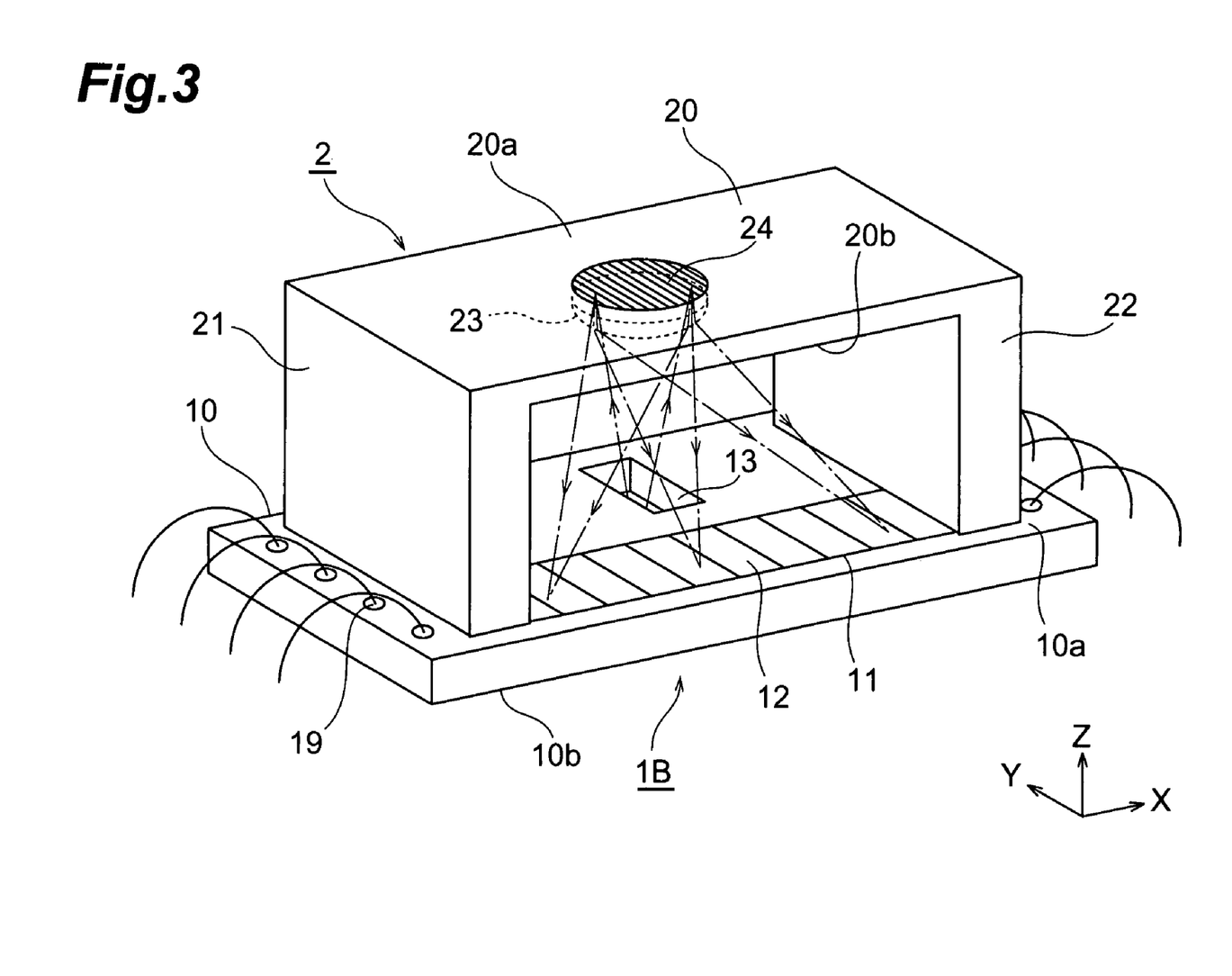
FIG. 3 is a perspective view illustrating a first embodiment of a spectrometer.
Figure 4:
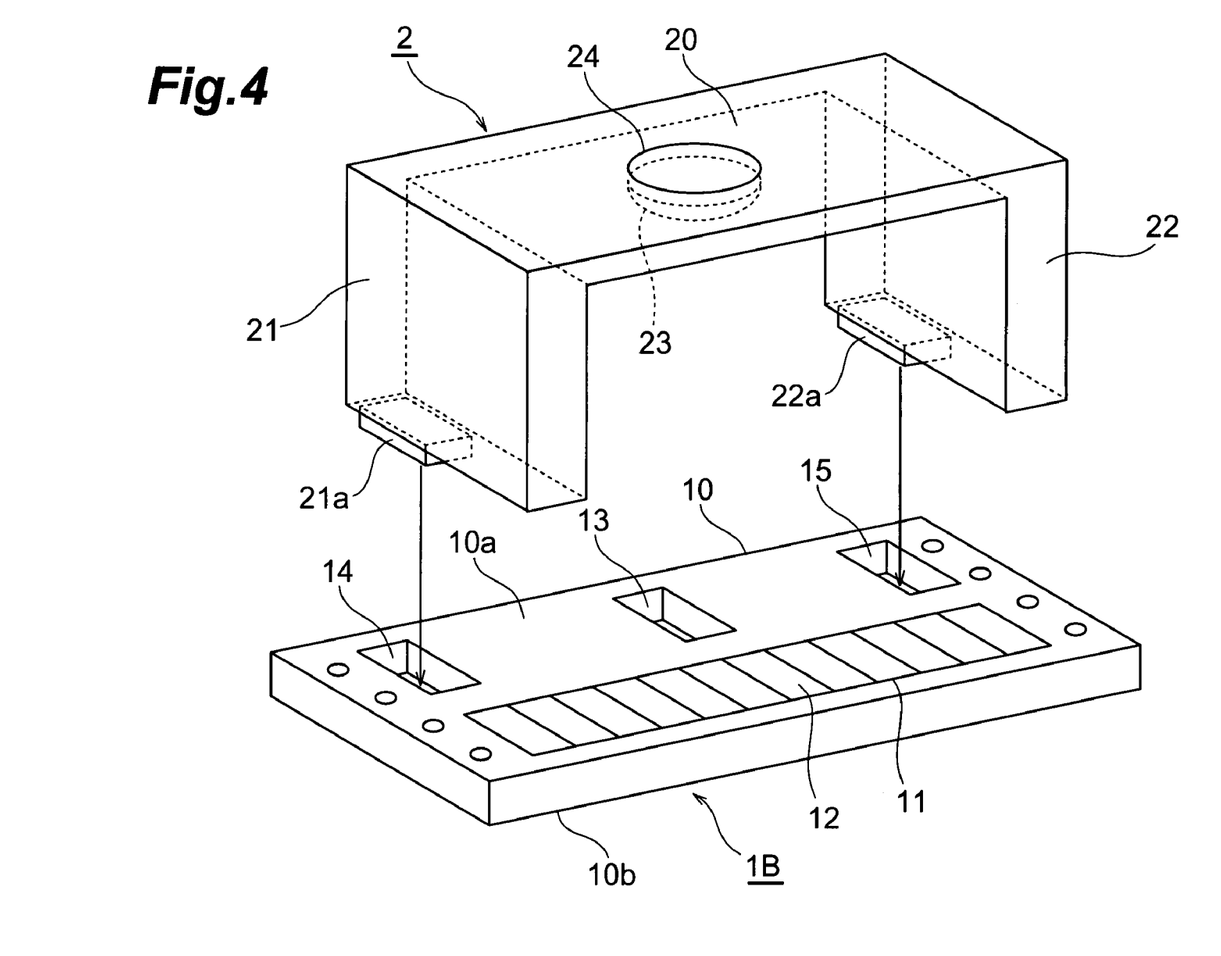
FIG. 4 is an exploded perspective view of the spectrometer shown in FIG. 3.

FIG. 3 is a perspective view illustrating a first embodiment of the spectrometer according to the present invention, and FIG. 4 is an exploded perspective view of the spectrometer shown in FIG. 3. The spectrometer of this embodiment comprises a photodetector 1B and a main body 2. The photodetector 1B comprises a substrate 10, a photodiode array 11 having a plurality of photodiodes 12, and a light input section 13 configured in the same manner as those of the photodetector 1A shown in FIG. 1.

The substrate 10 has two openings 14 and 15 formed therethrough from the upper surface 10a to the lower surface 10b in addition to the opening of the light input section 13. The openings 14 and 15 are detector-sided positioning sections used to position other members of a spectrometer on the upper surface 10a of the substrate 10, and provided and positioned in a predetermined positional relationship to the photodiode array 11.

In this embodiment, the positioning section 14 has a rectangular opening formed in a position on the rear side of the substrate 10 and in the vicinity of the left end of the photodiode array 11, and the positioning section 15 has a rectangular opening formed in a position on the rear side of the substrate 10 and in the vicinity of the right end of the photodiode array 11 as shown in the exploded view in FIG. 4.

The main body 2 is attached in position on the upper surface 10a of the substrate 10 of the photodetector 1B. The main body 2 comprises a plate portion 20 located above the substrate 10 and support portions 21 and 22 for supporting the plate portion 20 on the substrate 10. The plate portion 20 is of a rectangular plate-like shape, and a lower face 20b of the plate portion 20 is an optical surface opposed to the substrate 10 at a specific distance. Incident light to be measured by the spectrometer is passed through the opening of the light input section 13 and directed to the plate portion 20 above the light input section 13.

The support portion 21 is provided between the left end of the plate portion 20 and the substrate 10 and the support portion 22 is provided between the right end of the plate portion 20 and the substrate 10. Thereby, the main body 2 has a bridge-like configuration comprising the plate portion 20 and the support portions 21 and 22. The main body 2 is integrally formed of a transparent resin material which transmits light within a specific wavelength range.

As shown in FIG. 4, the support portion 21 has a lower surface on which a protrusion 21a is provided at a specific position, and the support portion 22 has a lower surface on which a protrusion 22a is provided at a specific position. The protrusions 21a and 22a are positioned and shaped so as to fit in the openings of the detector-sided positioning sections 14 and 15 on the upper surface 10a of the substrate 10, respectively. Thus, the protrusions 21a and 22a are main body-sided positioning sections which are fitted and engaged into the positioning sections 14 and 15 so that the main body 2 and the photodetector 1B can be assembled in position.

A lens 23 is provided on the lower (inner) face 20b of the plate portion 20 opposed to the substrate 10 of the photodetector 1B and located in a light path along which incident light having passed through the light input section 13 travels. The lens 23 is a lens having shape close to a semisphere, the center of which is located near or at a specific position on the upper (outer) face 20a of the plate portion 20. The lens 23 is formed integrally with the plate portion 20 and has a convexly curved portion protruded from the lower face 20b of the plate portion 20 and having a specific radius of curvature.

A planar diffraction grating 24 is provided in an area including the center of curvature of a lens 23 on the upper face 20a of the plate portion 20. The diffraction grating 24 is a dispersive element for separating incident light having entered through the light input section 13 and passed through the lens 23. This diffraction grating 24 is a reflective-type planar diffraction grating having a circular external shape corresponding to the shape of the lens 23 and configured to disperse light in the alignment direction of the photodiodes 12 of the photodiode array 11 (x-axis direction). Here, even for planer gratings, aberration-reduced blazed reflection gratings can be used.

In the spectrometer having the above configuration, incident light to be measured, which has entered through the light input section 13 formed through the substrate 10 of the photodetector 1B into the spectrometer and reached the lower face 20b of the plate portion 20, is collimated by the lens 23 and enters the planar reflective diffraction grating 24 as a dispersive element.

The incident light is reflected and simultaneously separated into its spectral components according to wavelength by the diffraction grating 24, and then emitted toward the upper surface 10a of the substrate 10 through the lens 23. Then, the separated spectral components enter the photodiode array 11 on the upper surface 10a of the substrate 10 while being converged and are detected by corresponding photodiodes 12.

Description will be hereinafter made of the effects of the spectrometer according to this embodiment.

In the spectrometer shown in FIG. 3 and FIG. 4, the photodetector 1B including the substrate 10 having the photodiode array 11 and the light input section 13 is used. Thereby, there can be obtained a spectrometer in which the photodiode array 11 and the light input section 13 as component elements thereof are positioned with high accuracy. Also with such a configuration, there is no need for a step of aligning and securing the photodiode array 11 and the light input section 13 to each other in producing a spectrometer. Thus, the production process of the spectrometer can be facilitated.

The spectrometer shown in FIG. 3 comprises the photodetector 1B having the photodiode array 11 and the light input section 13, and the main body 2 provided with the diffraction grating 24 as a dispersive element and disposed on the substrate 10 of the photodetector 1B. Such a spectrometer can be downsized as a whole because of its on-chip structure.

In this embodiment, the photodetector 1B and the main body 2 are assembled and secured in position by fitting the protrusions of the main body-sided positioning sections 21a and 22a in the openings of the detector-sided positioning sections 14 and 15. Such a configuration in which both the photodetector 1B and the main body 2 have positioning sections allows positioning by passive alignment in producing a spectrometer. Thus, the production process of the spectrometer can be further facilitated. Also, since the component elements of the spectrometer are three-dimensionally positioned with high accuracy because of the photodetector 1B and the main body 2, there can be obtained a chip-size spectrometer which can be produced by complete self-alignment.

In this embodiment, light to be measured is passed through the material of the specific plate portion of the plate portion 20. Thus, an optical body integrally formed of a transparent resin material is used as the main body 2. However, the main body 2 does not have to be entirely transparent as long as the portion through which light to be measured is passed is transparent. For example, in the configuration shown in FIG. 3, the support portions 21 and 22 may be formed of an opaque resin material when the plate portion 20 is formed of a transparent resin material.

When light is not passed through the main body, the main body may be entirely formed of an opaque resin material. In such a configuration, the main body itself functions as a light shielding member. The main body may be formed of a material other than a resin such as glass. In FIG. 3, the main body 2 has a bridge-like configuration comprising the plate portion 20 and the support portions 21 and 22 extending from right and left sides, respectively, of the plate portion 20. However, the main body 2 may have a configuration comprising the plate portion 20 and four support portions extending from the four sides of the plate portion 20.

In the above embodiment with the planar reflective diffraction grating, the tolerance for position deviation of the diffraction grating to the front, rear, left, and right direction may be large. In addition, the positioning accuracy can be improved by using the following method.

Namely, the openings of the detector-sided positioning sections 14, 15 are formed as the taper shape widening toward the upper side in the x-axis direction, and the main body-sided positioning sections 21a, 22a are similarly formed as the protrusion shape narrowing toward the lower side in the x-axis direction. In this configuration, the positioning accuracy within the x-axis direction is improved compared to the configuration with the simple rectangular shape protrusions.

Moreover, another configuration in which a 5-side closed shape is applied to the main body 2 instead of a bridge shape can be used. In this configuration, the detector-sided positioning sections of the taper shape widening toward the upper side in the y-axis direction are provided on the front and rear portions of the substrate 10, and the main body-sided positioning sections of the protrusion shape narrowing toward the lower side in the y-axis direction are provided on the lower surface of the main body 2. Thus, the positioning accuracy within the y-axis direction is improved.

In this case, it is preferable that the positioning sections for the x-axis direction provided on the left and right portions of the substrate 10 are formed with the opening width in the y-axis direction wider than the protrusion width for tolerance, and the positioning sections for the y-axis direction provided on the front and rear portions of the substrate 10 are formed with the opening width in the x-axis direction wider than the protrusion width for tolerance. In this configuration, the positioning in the x-axis direction is achieved by the positioning sections provided on the left and right portions of the substrate 10, and the positioning in the y-axis direction is achieved by the positioning sections provided on the front and rear portions of the substrate 10. Further, in addition to the above example, the positioning accuracy can be improved only with the left/right positioning sections formed as the taper shape widening toward the upper side in the x-axis direction and also in the y-axis direction.

As for the forming method of the main body 2, the whole main body 2 including optical elements such as the lens 23 and the diffraction grating 24 on the main body is preferably formed integrally by molding a specific material such as a resin material. Thereby, the photodiode array 11 and the light input section 13 of the photodetector 1B and the optical elements formed on the main body 2 such as the lens 23 and the diffraction grating 24 can be located in a predetermined positional relationship to each other with high accuracy.

In this case, the main body 2 is preferably produced by injection molding, since it can produce such a product with high accuracy. Also, the combination of the main body 2 produced by such a method and the photodetector 1B in which the photodiode array 11 and the light input section 13 are located in a predetermined positional relationship can reduce the alignment error considerably and allows mass production of small-sized spectrometers with high accuracy.

In the above configuration, a curved portion protruded from the lower face 20b of the plate portion 20 is used as the lens 23. In this case, the optical characteristics of the lens 23 depend on the material and thickness of the plate portion 20, the position of the center of the lens surface, the radius of curvature of the lens and so forth. This lens 23 can be a lens having a non-spherical shape for still reducing an aberration. The planar reflective diffraction grating 24 on the upper face 20a of the plate portion 20 can comprise a diffraction grating pattern such as a blazed grating formed simultaneously with the formation of the main body 2 by injection molding or the like, and a reflecting coating of aluminum or the like provided on the grating pattern.

Moreover, the diffraction grating 24 is preferably an aberration-reduced blazed grating, for example a diffraction efficiency optimized blazed grating or an aberration corrected grating or both. The type of the diffraction grating used as the dispersive element and the diffraction grating pattern thereof is not specifically limited. Further, it is preferable to realize an athermal design in which the dispersion characteristics are not changed with the temperature change, by a proper choice of a material of the main body, the grating line density, and the like. It is also preferable to blacken the outer facets of parts and members if necessary.

In the photodetector 1B shown in FIG. 4, the positioning sections 14 and 15 of the substrate 10 comprise rectangular openings. In this case, the internal faces of the openings are brought into contact with the side faces of the protrusions as the positioning sections 21a and 22a of the main body 2, whereby the positioning in the directions of the x- and y-axes is made. The opening shape of the positioning sections 14 and 15 may be changed as desired, together with the shape of the positioning sections 21a and 22a of the main body 2.

The positioning sections 14 and 15 are not limited to openings but may be recesses, protrusions, or electrode structures. In any case, the positioning sections 14 and 15 must be located in a predetermined positional relationship to the photodiode array 11. The detector-sided positioning section such as a recess or protrusion can be provided on the lower surface of the substrate. In this case, the main body is preferably formed with a clip-like shape or the like such that the substrate of the photodetector is sandwiched between an upper part and a lower part of the main body, and the main body-sided positioning section is provided on the lower part of the main body.

Figure 5:
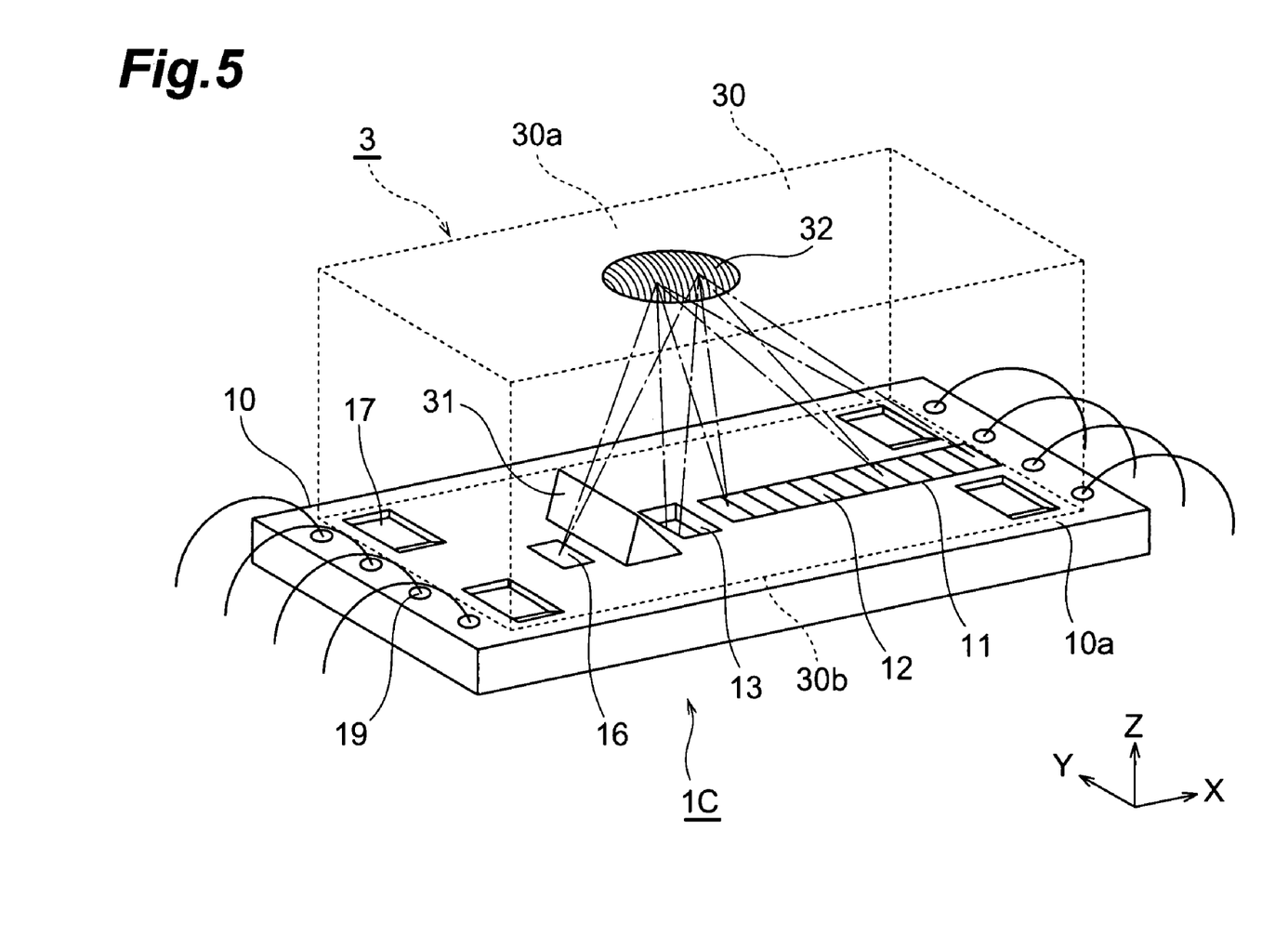
FIG. 5 is a perspective view illustrating a second embodiment of a spectrometer.

FIG. 5 is a perspective view illustrating a second embodiment of the spectrometer according to the present invention. The spectrometer of this embodiment comprises a photodetector 1C and a main body 3. In FIG. 5, the main body 3 is shown by dashed lines except a hereinafter described diffraction grating 32 provided on an upper surface thereof.

The photodetector 1C has a substrate 10 of a semiconductor material such as silicon. On the upper surface 10a of the substrate 10, a plurality of photodiodes 12 are arranged to form a photodiode array 11. In FIG. 5, the photodiode array 11 is located in the middle in the y-axis direction and on the right hand side in the x-axis direction on the upper surface 10a of the substrate 10, and the photodiodes 12 thereof are aligned in a direction along the x-axis.

A rectangular slit-like opening as a light input section 13 is provided in the center of the substrate 10 and on the left side of the photodiode array 11. The photodetector 1C of this embodiment is provided with a photodiode 16 in addition to the photodiodes 12 of the photodiode array 11. The photodiode 16 is disposed in a specific position on the left side of the light input section 13.

The substrate 10 has recesses 17 in the vicinity of the four corners of the upper surface 10a thereof in addition to the opening as the light input section 13. The four recesses 17 are detector-sided positioning sections for positioning the main body 3 on the upper surface 10a of the substrate 10.

The main body 3 is disposed in a specific position on the upper surface 10a of the substrate 10 of the photodetector 1C. The main body 3 comprises a main body part 30 having a rectangular solid shape and integrally formed of a transparent resin material which transmits light within a specific wavelength range. A lower face 30b of the main body part 30 is an optical surface which is in contact with the upper surface 10a of the substrate 10.

The main body part 30 has protrusions (not shown) on the lower face 30b fittable into the recesses as the positioning sections 17 formed in the upper surface 10a of the substrate 10 as main body-sided positioning section. A light shielding member 31 of an opaque resin material is incorporated in the lower face 30b of the main body part 30 such that it is located between the light input section 13 and the photodiode 16 when the main body 3 is mounted on the substrate 10 as shown in FIG. 5.

A diffraction grating 32 is provided on the upper (outer) face 30a of the main body part 30 and located in a light path along which incident light having passed through the light input section 13 travels. The diffraction grating 32 is a dispersive element for separating light having entered through the light input section 13, and is concave as viewed from the side of the substrate 10. The diffraction grating 32 is a concave reflective diffraction grating, and configured to disperse light in the alignment direction of the photodiodes 12 of the photodiode array 11.

In the spectrometer having the above configuration, incident light to be measured having entered in the spectrometer through the light input section 13 formed through the substrate 10 of the photodetector 1C reaches the upper face 30a of the main body part 30 and enters the concave reflective diffraction grating 32 as a dispersive element.

The incident light is reflected and simultaneously separated into its spectral components according to wavelength by the diffraction grating 32, and emitted toward the upper surface 10a of the substrate 10. Then, the separated spectral components enter the photodiode array 11 in the upper surface 10a of the substrate 10 while being converged and are detected by corresponding photodiodes 12. Further, zero-order light from the diffraction grating 32 enters the photodiode 16 provided in addition to the photodiode array 11 and is detected thereby.

Description will be hereinafter made of the effects of the spectrometer according to this embodiment.

In the spectrometer shown in FIG. 5, the photodetector 1C including the substrate 10 having the photodiode array 11 and the light input section 13 is used. Thereby, there can be obtained a spectrometer in which component elements thereof are positioned with high accuracy as in the case with the spectrometer shown in FIG. 3. Also, there is no need for a step of aligning the photodiode array 11 and the light input section 13, so that the production process of the spectrometer can be facilitated.

In this embodiment, a massive main body 3 with a rectangular solid shape is used instead of a hollow main body with a bridge-like configuration, and a concave reflective diffraction grating 32 is used as a dispersive element instead of a lens and a planar reflective diffraction grating. With such a configuration, spectroscopic measurement of light to be measured can be properly executed. The concave reflective diffraction grating 32 can comprise a diffraction grating pattern formed in the concave curved portion formed in the upper face 30a of the main body part 30 and a reflecting coating of aluminum or the like provided on the grating pattern.

A concave reflective diffraction grating can be applied to a main body having a bridge-like configuration or a main body having four support portions extending from the four sides of its plate portion. In this case, a diffraction grating pattern is formed in the concave curved portion formed in the upper or lower surface of the plate portion, and a reflecting coating of aluminum or the like provided thereon. When the concave reflective diffraction grating is provided in the lower surface of the plate portion, light is not passed through the main body. Thus, the entire main body may be formed of a opaque resin material so that it can function an light shielding member.

Description will be hereinafter made of the spectral characteristics of the spectrometer shown in FIG. 5 in detail. Here, for the detailed configuration of the spectrometer, the height from the substrate 10 to the concave diffraction grating 32 of the main body 3 is 8.57 mm, and the numerical aperture NA of the spectrometer fits to those of standard optical fibers. The diffraction grating pattern of the diffraction grating 32 has an average line density of 1000 lines/mm, and the line density is varied depending on position so that the spectral characteristics of the spectrometer can be optimized.

Figure 6:
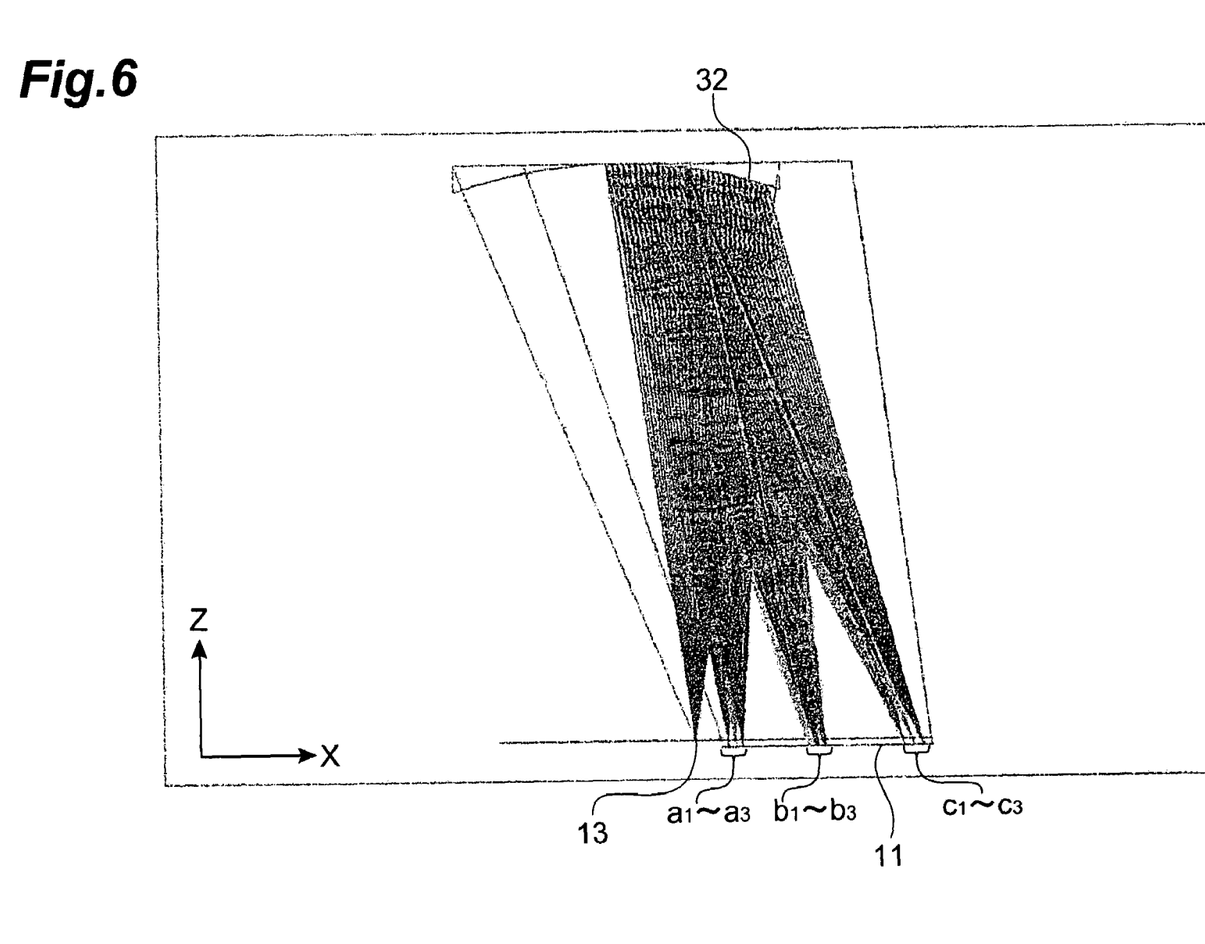
FIG. 6 is a front view illustrating paths of spectral components of light separated by the spectrometer shown in FIG. 5.
Figure 7:
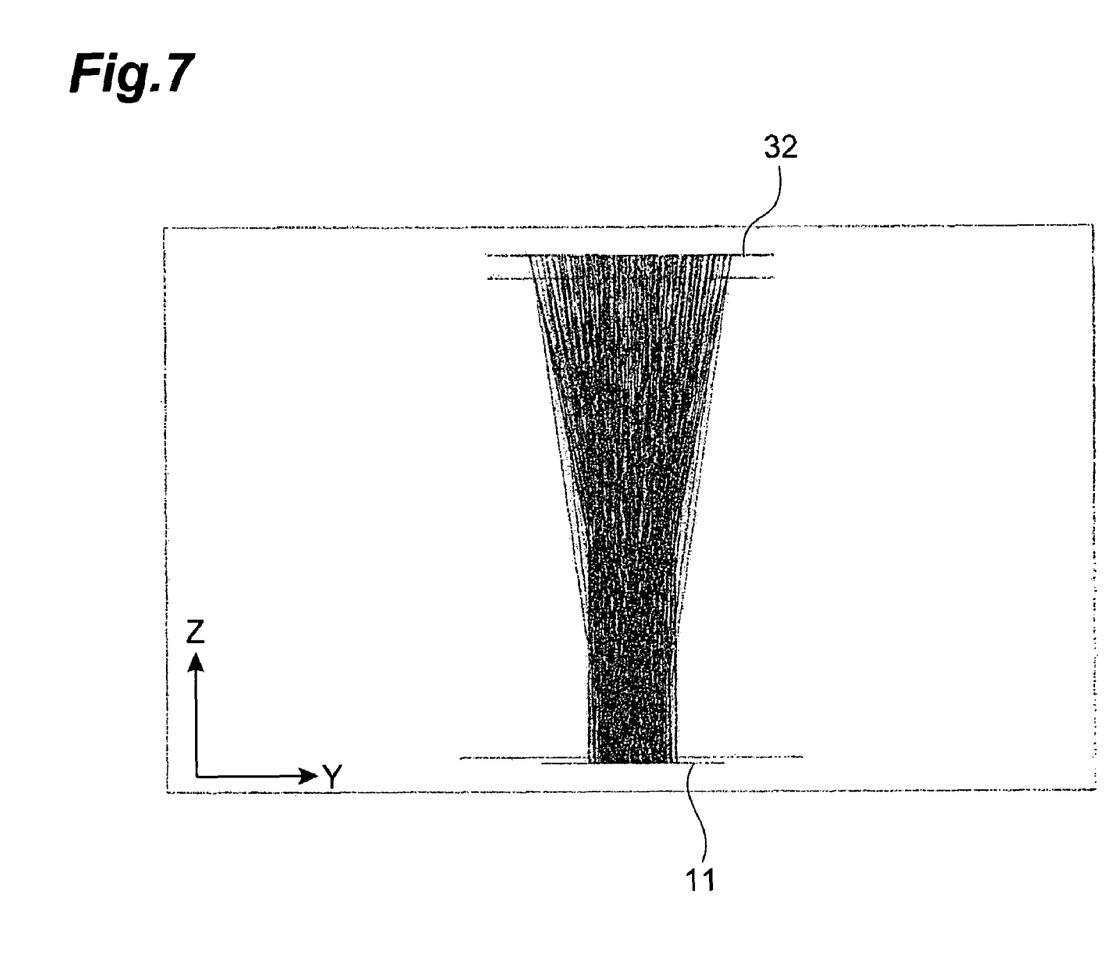
FIG. 7 is a side view illustrating paths of spectral components of light separated by the spectrometer shown in FIG. 5.

FIG. 6 is a front view illustrating paths of spectral components of light separated by the spectrometer shown in FIG. 5, for the direction in which the light is dispersed, and FIG. 7 is a side view illustrating paths of the spectral components, for the direction in which the light is not dispersed. Here, the light input section 13 formed through the substrate 10 is a slit with a length (y-axis direction) of 1 mm and a width (x-axis direction) of 80 μm.

As shown in the drawing, light having entered through the light input section 13 is reflected and separated into its spectral components by the concave reflective diffraction grating 32. Then, each of the spectral components $a_1$ to $a_3$, $b_1$ to $b_3$, and $c_1$ to $c_3$, is converged to a corresponding point on the photodiode array 11. Thereby, spectroscopic measurement of light to be measured is performed.

When the distance from the light input section and the photodiode array to the dispersive element is as small as about 8 mm as above, the component elements of the spectrometer must be positioned with high accuracy in order to perform spectroscopic measurement with high precision. With the above configuration in which the photodetector 1C including the substrate 10 having the light input section 13 and the photodiode array 11 is used, spectral measurement can be made with high precision.

Figure 8:
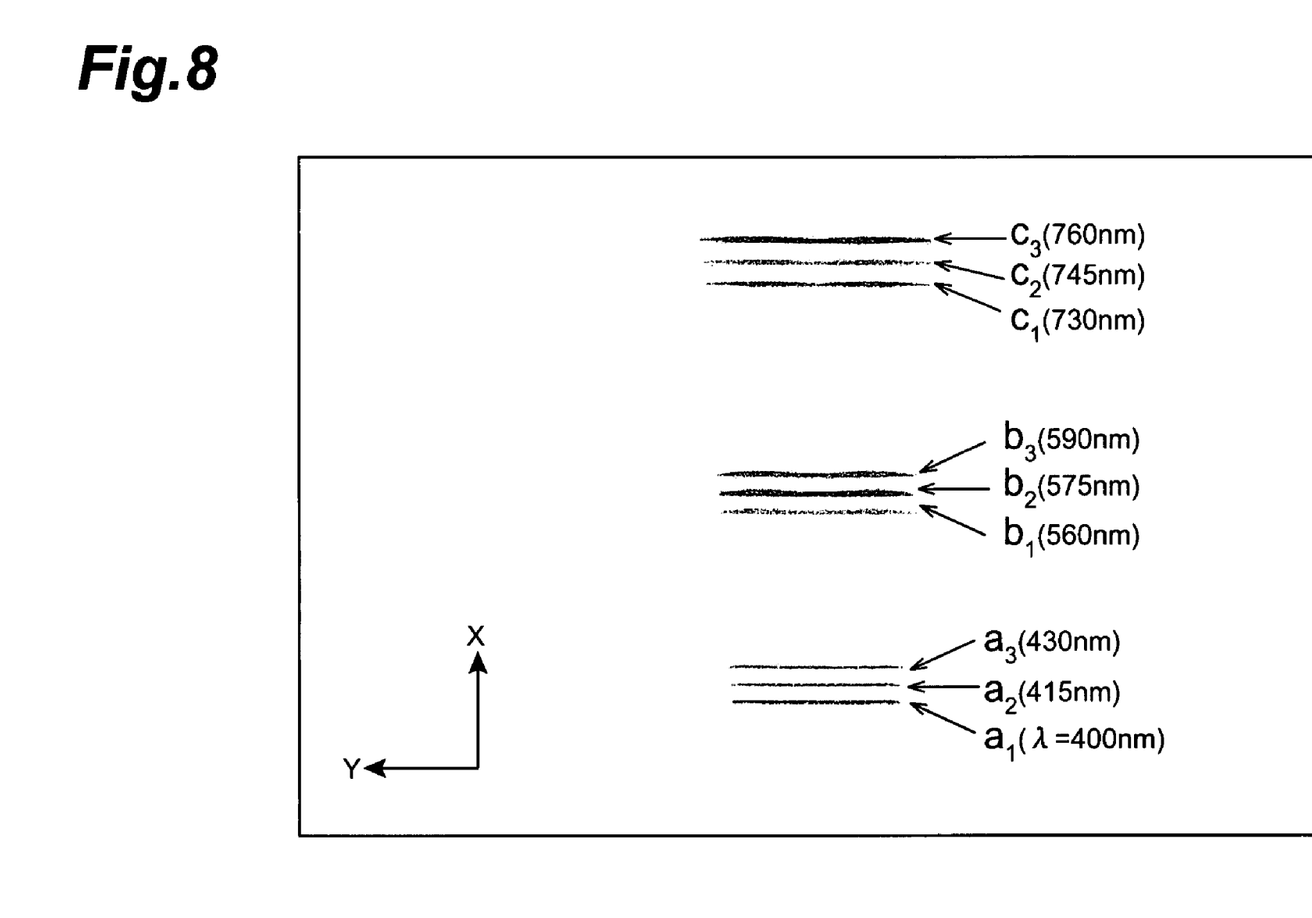
FIG. 8 is a plan view illustrating an example of the shapes of spots formed on an upper surface of a substrate by spectral components of light.

FIG. 8 is a plan view illustrating an example of the shapes of spots formed on the photodiode array 11 on the substrate 10 by spectral components of light. Here, the light input section 13 has a slit with a length of 1 mm and a virtual width of 0 μm. In the drawing, spots $a_1$ to $a_3$, $b_1$ to $b_3$, and $c_1$ to $c_3$ formed by the spectral components of the light are shown.

The spots $a_1$, $a_2$, and $a_3$ correspond to spectral components with a wavelength λ of 400 nm, 415 nm, and 430 nm, respectively. The spots $b_1$, $b_2$, and $b_3$ correspond to spectral components with a wavelength λ of 560 nm, 575 nm, and 590 nm, respectively. The spots $c_1$, $c_2$, and $c_3$ correspond to spectral components with a wavelength λ of 730 nm, 745 nm, and 760 nm, respectively. As shown in FIG. 8, the spectral components are dispersed in a direction along the x-axis.

In this example, the spots have a length of 1.54 mm, and a width of 3.2 mm as a whole. In this case, a photodiode array in which photodiode pixels with a length in the y-axis direction of about 1.5 mm are aligned is preferably used as the photodiode array 11.

Figure 9:
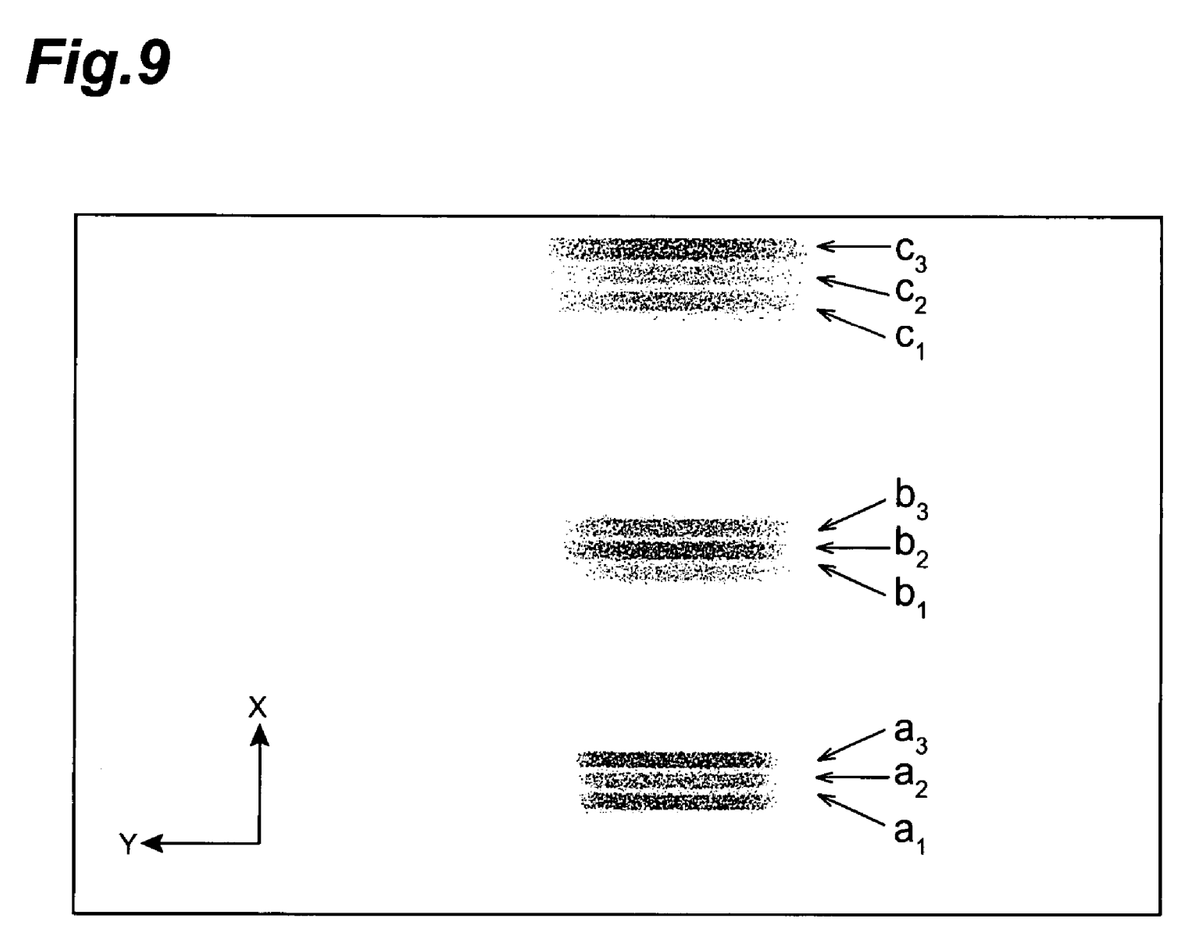
FIG. 9 is a plan view illustrating another example of the shapes of spots formed on an upper surface of a substrate by spectral components of light.

FIG. 9 is a plan view illustrating another example of the shapes of spots formed on the photodiode array by spectral components of light. Here, the light input section 13 has a slit with a length of 1 mm and a width of 80 μm. In the drawing, spots $a_1$ to $a_3$, $b_1$ to $b_3$, and $c_1$ to $c_3$ formed by the spectral components of the light are shown. In this example, the spots have a length of 1.54 mm as in the case with the example shown in FIG. 8.

Figure 10:
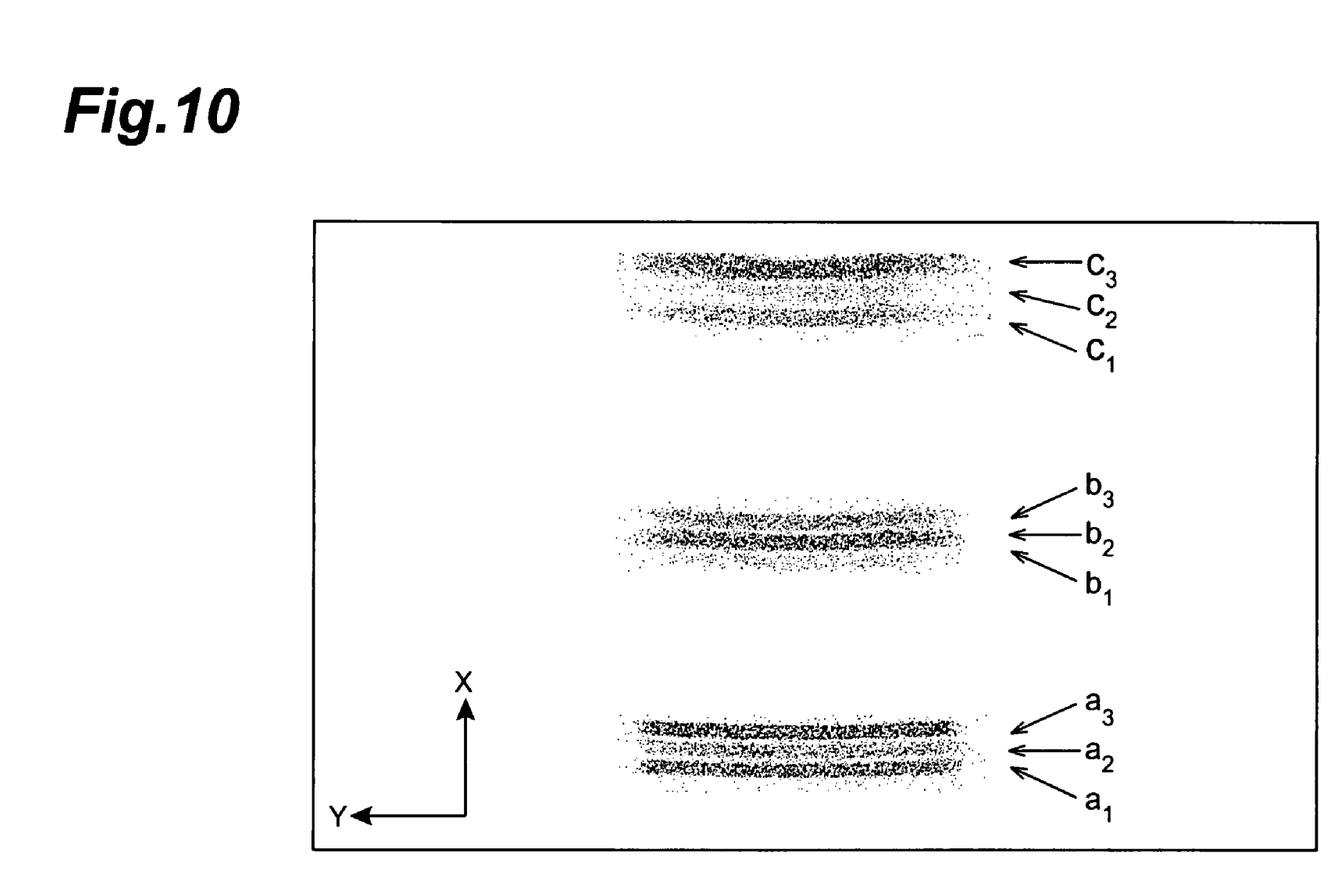
FIG. 10 is a plan view illustrating another example of the shapes of spots formed on an upper surface of a substrate by spectral components of light.

FIG. 10 is a plan view illustrating another example of the shapes of spots formed on the photodiode array by spectral components of light. Here, the light input section 13 has a slit with a length of 2 mm and a width of 80 μm. In the drawing, spots $a_1$ to $a_3$, $b_1$ to $b_3$, and $c_1$ to $c_3$ formed by the spectral components of the light are shown. In this example, the spots have a length of 2.5 mm. In this case, a photodiode array in which photodiode pixels with a length in the y-axis direction of about 2.5 mm are aligned is preferably used as the photodiode array 11.

The photodetector of the present invention and the spectrometer using the photodetector are not limited to the above embodiments, and various modifications can be made thereto. For example, the light input section 13, which comprises one opening formed through the substrate 10 in the above embodiments, may comprise a plurality of openings. In this case, it is preferred to provide a plural arrays of photodiodes in a photodiode array corresponding to the plurality of the openings. According to this configuration, various types of spectrometers can be realized, for example, types of spectrometers such as spectrometers having more than one input channel, or spectrometers which resolve spectral properties along a line of input channels.

Alternatively, the spectrometer may comprise a reflective diffraction grating which is provided on a surface of the substrate and which functions as the dispersive element, and a reflecting mirror provided on a face of the main body and located in a specific position in a light pass along which light travels from the light input section to the reflective diffraction grating and from the reflective diffraction grating to the photodetection element array. With such a configuration, spectroscopic measurement of light to be measured can be properly executed.

In the above embodiments, the main body of the optical body is mounted on the substrate of the photodetector, however, the substrate may be smaller than the main body. In general, the main body is disposed in a specific position in contact with a surface of the substrate. As for input and output of an electric signal to/from the substrate, a flip-chip bonding technique can be used instead of a wire bonding.

Figure 11A:
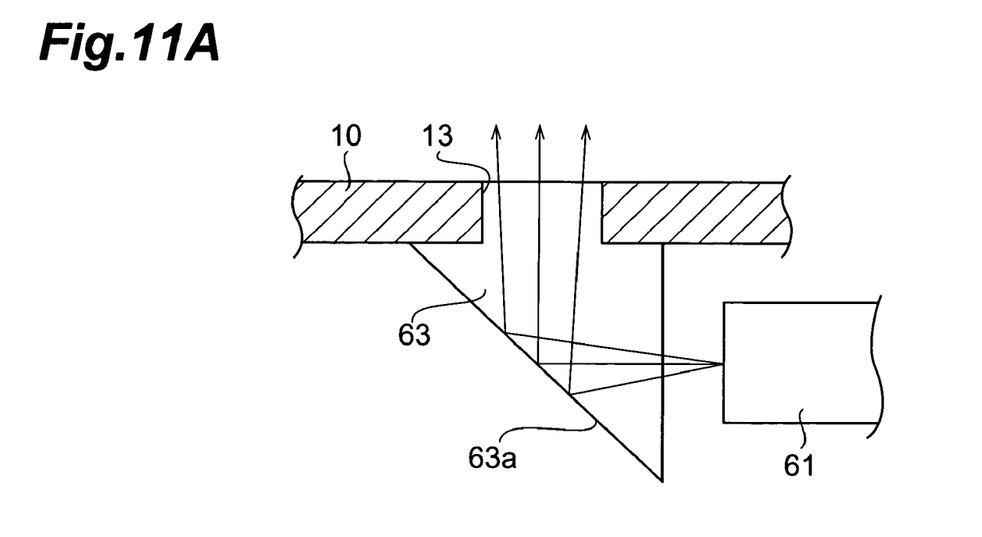
FIGS. 11A to 11C are views showing examples of an optical member provided in an opening of a light input section.
Figure 11B:
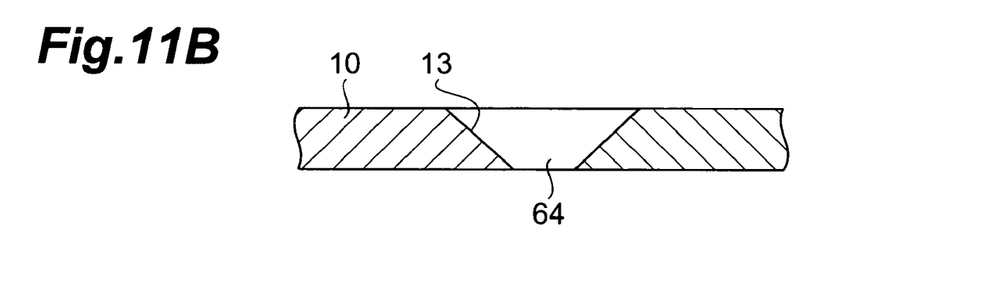
Figure 11C:
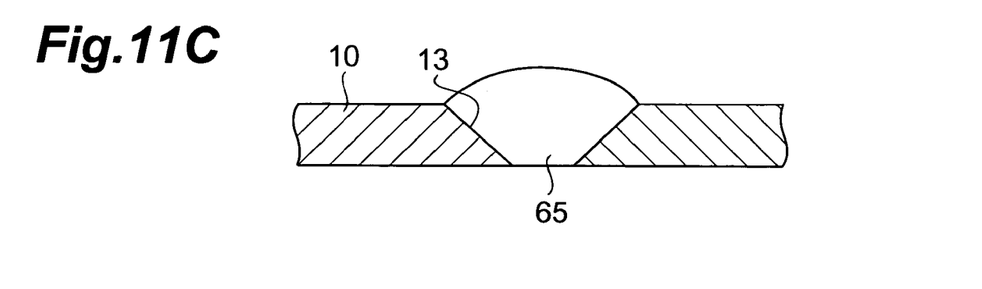

Further, as mentioned on FIGS. 1 and 2, an optical member may be provided in the light input section. FIGS. 11A to 11C show examples of such optical members. In FIG. 11A, a prism member 63 having a surface 63a with high reflection coating is inserted into the light input section 13 from the lower side of the substrate 10. This prism member 63 is used for putting in light through the light input section 13 emitted from the optical fiber 61. In FIG. 11B, a filter glass member 64 is provided and positioned in the taper-shape light input section 13. In FIG. 11C, a lens member 65 is provided and positioned in the taper-shape light input section 13.

The photodetector of the present invention and the spectrometer using the photodetector provide the following effects as has been described above in detail. Namely, according to a configuration in which a photodetector includes a substrate having a photodetection element array used to detect separated spectral components of incident light and an opening used as a light input section of the incident light to be measured when the photodetector is used in a spectrometer, the photodetection element array and the light input section as component elements of a spectrometer can be located in a predetermined positional relationship to each other with high accuracy. Thus, there can be obtained a photodetector and a spectrometer in which component elements thereof are positioned with high accuracy.

Additionally, the degree of freedom in arranging the photodetection element array and the light input section can be improved. Also, the spectrometer can be downsized. In addition, there is no need for a step of aligning and securing a photodetection element array and a light input section, so that the production of the spectrometer can be facilitated.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A photodetector comprising:
   a substrate;
   a photodetection element array having a plurality of photodetection elements formed on said substrate in a predetermined arrangement; and
   a light input section being integrally formed with said photodetection element array on said substrate, and including an opening formed through said substrate in a predetermined positional relationship to said photodetection element array for allowing incident light to be detected by said photodetection elements to pass therethrough.

2. The photodetector as claimed in claim 1, further comprising a positioning section including an opening formed through said substrate, a recess formed in said substrate, a protrusion formed on said substrate, or an electrode structure formed on said substrate in a predetermined positional relationship to said photodetection element array for locating a given member in a specific position on one surface of said substrate.

3. The photodetector as claimed in claim 1, wherein said light input section is filled by a material which transmits light within one or a plurality of wavelength ranges by a specific transmittance.

4. The photodetector as claimed in claim 1, further comprising an optical member provided in said light input section for transmitting light under specific conditions.

5. The photodetector as claimed in claim 1, further comprising a photodetection element additionally provided on said substrate in a predetermined positional relationship to said photodetection element array.

6. The photodetector as claimed in claim 1, wherein said light input section includes a plurality of openings and said photodetection element array comprises a plural arrays of photodetection elements provided to correspond to said plurality of openings.

7. The photodetector as claimed in claim 1, wherein an optical fiber is provided for incident light through said light input section.

8. A spectrometer comprising:
   a photodetector according to claim 1;
   a main body disposed in a specific position in contact with a surface of said substrate; and a dispersive element provided on a face of said main body or a surface of said substrate and located in a light path along which light travels from said light input section to said photodetection element array, wherein light having entered through said light input section is separated into its spectral components by said dispersive element and said spectral components are detected by corresponding photodetection elements of said photodetection element array.

9. The spectrometer as claimed in claim 8, wherein said photodetector has a detector-sided positioning section including an opening formed through said substrate, a recess formed in said substrate, a protrusion formed on said substrate, or an electrode structure formed on said substrate in a predetermined positional relationship to said photodetection element array, and wherein said main body has a main body-sided positioning section engageable with said detector-sided positioning section for positioning said main body on said substrate.

10. The spectrometer as claimed in claim 8, wherein said main body comprises a plate portion disposed at a distance from said substrate of said photodetector and having an inside face which is an optical surface opposed to said substrate; and a support portion for supporting said plate portion on said substrate.

11. The spectrometer as claimed in claim 10, further comprising:
a lens provided on said inside face of said plate portion and located in said light path; and
a planar reflective diffraction grating which is located on said outside face of said plate portion in a predetermined positional relationship to said lens and which functions as said dispersive element for separating light having passed through said lens.

12. The spectrometer as claimed in claim 10, further comprising a concave reflective diffraction grating which is provided on said inside or outside face of said plate portion and located in said light path and which functions as said dispersive element.

13. The spectrometer as claimed in claim 8, wherein said main body is disposed such that an optical surface opposed to said substrate is in contact with said substrate and formed of a material which transmits light within a specific wavelength range.

14. The spectrometer as claimed in claim 13, further comprising a concave reflective diffraction grating which is provided on an outside face of said main body and located in said light path and which functions as said dispersive element.

15. The spectrometer as claimed in claim 8, further comprising a reflective diffraction grating which is provided on a surface of said substrate and which functions as said dispersive element; and
a reflecting mirror provided on a face of said main body and located in a specific position in a light pass along which light travels from said light input section to said reflective diffraction grating and from said reflective diffraction grating to said photodetection element array.

16. The spectrometer as claimed in claim 8, wherein said main body and an optical element on said main body are integrally formed by molding a specific material.

17. The spectrometer as claimed in claim 8, further comprising one or a plurality of light shielding members provided between said light input section and said photodetection element array.

18. The spectrometer as claimed in claim 8, wherein said dispersive element is a diffraction efficiency optimized blazed grating or an aberration corrected grating or both.

* * * * *